(12) United States Patent
Chiesura

(10) Patent No.: US 12,420,366 B2
(45) Date of Patent: Sep. 23, 2025

(54) METHOD FOR MANUFACTURING A WIND TURBINE BLADE

(71) Applicant: Siemens Gamesa Renewable Energy A/S, Brande (DK)

(72) Inventor: Gabriele Chiesura, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/552,491

(22) PCT Filed: Mar. 7, 2022

(86) PCT No.: PCT/EP2022/055764
§ 371 (c)(1),
(2) Date: Sep. 26, 2023

(87) PCT Pub. No.: WO2022/207246
PCT Pub. Date: Oct. 6, 2022

(65) Prior Publication Data
US 2024/0157491 A1  May 16, 2024

(30) Foreign Application Priority Data
Apr. 1, 2021 (EP) .................................. 21166700

(51) Int. Cl.
*B23P 19/10* (2006.01)
*B23P 15/04* (2006.01)
*F03D 1/06* (2006.01)

(52) U.S. Cl.
CPC ............ *B23P 19/10* (2013.01); *B23P 15/04* (2013.01); *F03D 1/0677* (2023.08); *F05B 2230/608* (2013.01)

(58) Field of Classification Search
CPC .... B23P 15/04; B23P 19/04; F05B 2230/502; F05B 2230/608
See application file for complete search history.

(56) References Cited

U.S. PATENT DOCUMENTS

| 7,740,453 B2 | 6/2010 | Zirin et al. |
| 7,854,594 B2 | 12/2010 | Judge |

(Continued)

FOREIGN PATENT DOCUMENTS

| CN | 112211777 A | 1/2021 |
| EP | 2075467 A2 | 7/2009 |

(Continued)

OTHER PUBLICATIONS

International Preliminary Report on Patentability, issued Oct. 3, 2023.

(Continued)

*Primary Examiner* — Christopher J. Besler
(74) *Attorney, Agent, or Firm* — Schmeiser, Olsen & Watts LLP

(57) ABSTRACT

A method for manufacturing a wind turbine blade, the method including the steps: a) positioning an outboard blade section at a predefined end position, the outboard blade section including an outboard end portion, b) positioning an inboard blade section adjacent to the outboard blade section, the inboard blade section including an inboard end portion, c) determining a deviation of a current position of the inboard end portion of the inboard blade section with respect to the outboard end portion of the outboard blade section from a nominal position of the inboard end portion with respect to the outboard end portion, and d) moving the inboard blade section relative to the outboard blade section to compensate for the determined deviation. The complexity of the alignment procedure when aligning lengthwise blade sections are reduced and the accuracy of the alignment increased.

12 Claims, 10 Drawing Sheets

(56) References Cited

U.S. PATENT DOCUMENTS

| | | | |
|---|---|---|---|
| 7,922,454 | B1 | 4/2011 | Riddell |
| 7,998,303 | B2 | 8/2011 | Baehmann et al. |
| 8,167,569 | B2 | 5/2012 | Livingston |
| 8,517,689 | B2 | 8/2013 | Kyriakides et al. |
| 2021/0010460 | A1* | 1/2021 | Henrichsen et al. . F03D 1/0675 |

FOREIGN PATENT DOCUMENTS

| | | |
|---|---|---|
| EP | 2432972 A1 | 3/2012 |
| EP | 2075467 B1 | 2/2017 |
| EP | 3747639 A1 | 12/2020 |
| EP | 3763938 A1 | 1/2021 |
| WO | 2010135737 A1 | 11/2010 |
| WO | 2018091735 A1 | 5/2018 |
| WO | 2018215457 A1 | 11/2018 |

OTHER PUBLICATIONS

Taiwanese Office Action; Mailing date Oct. 20, 2022.
PCT International Search Report and Written Opinion of International Searching Authority mailed Jun. 3, 2022 corresponding to PCT International Application No. PCT/EP2022/055764 filed Mar. 7, 2022.

\* cited by examiner

METHOD FOR MANUFACTURING A WIND TURBINE BLADE

CROSS-REFERENCE TO RELATED APPLICATIONS

This application claims priority to PCT Application No. PCT/EP2022/055764, having a filing date of Mar. 7, 2022, which claims priority to EP Application No. 21166700.1, having a filing date of Apr. 1, 2021, the entire contents both of which are hereby incorporated by reference.

FIELD OF TECHNOLOGY

The following relates to a method for manufacturing a wind turbine blade.

BACKGROUND

Producing more power using a wind turbine under given wind conditions can be achieved by increasing the size of the blades. However, the manufacture and transport of wind turbine blades is becoming increasingly difficult for increasing blade sizes.

It is known to manufacture lengthwise blade sections, such as an inboard blade section and an outboard blade section or possible even more sections, separately and join the sections with each other. This requires an accurate alignment of the blade sections to achieve a high robustness of the assembled blade in the connection region(s) and also over the entire length of the blade. In particular, the correct transfer of loads through the blade during operation of the wind turbine depends on an accurate alignment of the lengthwise blade sections. Further, also the correct aerodynamic profile of the assembled blade, e.g., the twist of the blade from the root to the tip, is a crucial point in aligning lengthwise blade sections.

For large sizes of wind turbine blades the alignment is challenging as large structures need to be positioned exactly. Further, an outboard blade section is a rather compliant structure for which a correct position at one end may not transfer to a correct position at the other end. For example, an outboard blade section is less stiff and may deform by its own weight, e.g. depending on the length and/or thickness of the blade shell and/or moment-of-inertia of the cross section (s) in such section. Furthermore, small errors in the production of the blade sections may lead to large deviations with respect to the overall alignment of the assembled blade sections.

SUMMARY

An aspect relates to provide an improved method for manufacturing a wind turbine blade by assembling individual lengthwise blade sections.

Accordingly, a method for manufacturing a wind turbine blade is proposed. The method comprises the steps:
a) positioning an outboard blade section at a predefined end position, the outboard blade section comprising an outboard end portion,
b) positioning an inboard blade section adjacent to the outboard blade section, the inboard blade section comprising an inboard end portion,
c) determining a deviation of a current position of the inboard end portion of the inboard blade section with respect to the outboard end portion of the outboard blade section from a nominal position of the inboard end portion with respect to the outboard end portion, and
d) moving the inboard blade section relative to the outboard blade section to compensate for the determined deviation.

Thus, the complexity of the alignment procedure when aligning lengthwise blade sections can be reduced and the accuracy of the alignment increased. In particular, the outboard blade section is more compliant and is, therefore, fixed in a predefined position. Further, the inboard blade section is often stiffer and, therefore, the alignment is performed by only moving the inboard blade section. Moving only the inboard blade section is also advantageous in that a rotation of the inboard blade section can be performed more easily.

Furthermore, determining a deviation of the current position of the inboard end portion of the inboard blade section with respect to the outboard end portion of the outboard blade section and compensating for this determined deviation allows a global alignment from the inboard end portion to the outboard end portion. This ensures an accurate alignment of the blade sections from the inboard end portion to the outboard end portion. The accurate alignment from the inboard end portion to the outboard end portion ensures a high robustness of the assembled blade, the correct transfer of loads through the assembled blade and the correct aerodynamic profile of the assembled blade, e.g., the correct twist of the blade from the root to the tip.

By applying a global alignment from the inboard end portion to the outboard end portion, an accurate alignment of lengthwise blade sections can be ensured even in the case of very large blades.

The wind turbine blade is part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected, optionally via a transition piece, to a foundation of the wind turbine, e.g. a concrete foundation or a monopile in the seabed commonly used for offshore installations.

The assembled wind turbine blade comprises at least two lengthwise blade sections dividing the blade in a lengthwise direction.

In the case that the assembled wind turbine blade comprises exactly two lengthwise blade sections, namely the inboard blade section and the outboard blade section, the inboard blade section may comprise a root portion and the outboard blade section may comprise a blade tip. The root portion is, in particular, configured to be attached to a wind turbine hub or pitch bearing of the wind turbine hub. The blade tip is, in particular, a tip that terminates the fully assembled blade at its very end. As in this case the fully assembled wind turbine blade comprises exactly two lengthwise blade sections, there is one blade section joint.

In the case that the assembled wind turbine blade comprises more than two lengthwise blade sections, one or both of the inboard blade section and the outboard blade section may also be an intermediate blade section (henceforth called "intermediate inboard blade section" and "intermediate outboard blade section", respectively). Nevertheless, also in this case the (intermediate) outboard blade section is configured to be arranged further away from the rotor hub than the (intermediate) inboard blade section. As in this case the fully assembled wind turbine blade comprises more than two lengthwise blade sections, there is more than one blade section joint.

Thus, by example, a blade may be comprised of three (or more) individual blade sections that are assembled using the present method for at least one of the two (or more) blade section joints. Accordingly, and by example, an intermediate outboard blade section may be joined to an inboard section of a blade as to prepare a new inboard section eventually to be jointed to a further outboard section, the further outboard section comprising, for example, a blade tip that terminates the blade. A similar approach may be used for joining an intermediate inboard section of a blade to an outboard blade section, the outboard section comprising, for example, a blade tip that terminate the blade, so as to create a new outboard section eventually to be joined with another inboard section.

Hence, the outboard end portion of the outboard blade section may comprise a blade tip terminating the assembled blade or (in case it is an intermediate outboard blade section) may be configured to be attached to yet another outboard blade section, possibly using the same alignment method as outlined above. Likewise, the inboard end portion of the inboard blade section may comprise a root portion configured to be attached to the rotor hub or (in case it is an intermediate inboard section) may be configured to be attached to yet another inboard blade section, possibly using the same alignment method as outlined above.

When determining the deviation of the current position of the inboard end portion with respect to the outboard end portion from a nominal position, the current position of the inboard end portion is, in particular, measured. For example, a current position of a circumference of the inboard end portion and/or a current position of a cross-section plane of the inboard end portion is measured.

According to an embodiment, the outboard end portion of the outboard blade section is a blade tip and/or the inboard end portion of the inboard blade section is a root portion.

Thus, the complexity of the alignment procedure when aligning lengthwise blade sections can be further reduced and the accuracy of the alignment increased.

For example, when the inboard end portion of the inboard blade section is a root portion, such an inboard blade section with a root portion is often the stiffest blade section of the whole blade. Thus, as the alignment is performed by only moving the relatively stiff inboard blade section comprising the root portion, the accuracy of the alignment is further increased. Further, rotation of the inboard blade section comprising the root portion can be performed more easily. This is the case as a rotation of the inboard blade section can be operated from the blade root plane which is most often circular such that the rotation axis coincides with the center of the blade root plane. For example, the blade root cross-section is most often circular for attachment to a circular pitch bearing of the wind turbine hub.

For example, before or after the alignment of the inboard and outboard blade sections, an annular edge of the root plane is machined such that the root plane defined by the annular edge provides an interface for connection to the hub such that the blade tip is in the correct position. For example, in the case of determining the current position of the root portion by determining the current position of the circumference of the root portion, the root plane may be machined before or after alignment of the inboard and outboard blade sections. For example, in the case of determining the current position of the root portion by determining the current position of the root plane, the root plane may be machined before alignment of the inboard and outboard blade sections.

When the outboard end portion of the outboard blade section is a blade tip and the inboard end portion of the inboard blade section is a root portion, in step c) a deviation of a current position of the blade root portion with respect to the blade tip is determined. Compensating for this determined deviation in step d) by moving the inboard blade section allows then a global root-to-tip alignment. This ensures an accurate alignment of the blade sections from the root to the tip, i.e. over the entire length of the blade The accurate alignment from the root to the tip ensures a high robustness of the assembled blade, the correct transfer of loads through the assembled blade and the correct aerodynamic profile of the assembled blade, e.g., the correct twist of the blade from the root to the tip.

According to a further embodiment, the root portion comprises a root plane. Further, in step c), a deviation of a current position of the blade root plane with respect to the outboard end portion from a nominal position of the blade root plane with respect to the outboard end portion is determined.

The root plane is an interface for connecting the inboard blade section with the rotor hub. The root plane is defined by an edge of the inboard blade section configured for connection with the rotor hub. In particular, the root plane is defined by an edge of an essentially cylindrical root portion of the inboard blade section.

When determining the deviation of the current position of the blade root plane with respect to the outboard end portion (e.g., the blade tip) from a nominal position, the current position of the blade root plane is, in particular, measured. For example, the current position of the blade root plane including the current position of a center of the blade root plane is measured and a deviation from a nominal position of the blade root plane and the center of the blade root plane is determined. The center of the blade root plane is, in particular, the center of the essentially cylindrical root portion of the inboard blade section.

The current position of the blade root plane is, in particular, a three-dimensional position.

In particular, the root portion of the inboard blade section most often has a circular cross-section. The inboard blade section, in particular the root portion, comprises, for example, at its inboard end an annular edge enclosing an opening. The inboard end of the inboard blade section, in particular said annular edge, defines, for example, a root plane. The annular edge of the root portion of the inboard blade section is, for example, configured for connection to the hub of the rotor. During manufacturing of the inboard blade section, the annular edge is, for example, machined such that the root plane defined by the annular edge provides an interface for connection to the hub such that the blade tip is in the correct relative position.

The wind turbine blade, i.e. the root portion of the inboard blade section, is, for example, configured to be fixedly connected to the hub including fixation to a hub extender attached to the hub. The wind turbine blade is, for example, directly bolted to the hub or to the hub extender.

Alternatively, the wind turbine blade, e.g., the root portion of the inboard blade section, is configured to be rotatably connected to the hub. For example, the wind turbine blade is connected to a pitch bearing of the wind turbine, and the pitch bearing is connected to the hub. The pitch bearing is configured to adjust the angle of attack of the blade according to the wind speed to control the rotational speed of the blade.

Apart from the essentially cylindrical root portion connected with the hub, the wind turbine blade has an aerodynamically shaped cross-section that most commonly changes in shape along the blade or blade section in spanwise direction (airfoil(s)). The wind turbine blade, i.e. each of its blade sections, comprises, for example, a pressure side (upwind side) and a suction side (downwind side). The pressure side and the suction side are connected with each other at a leading edge and a trailing edge. The pressure and suction sides and the leading and trailing edges define an interior cavity of the wind turbine blade.

The outboard blade section is, for example, positioned at a predefined end position according to a CAD model (computer aided design model) of the assembled blade. Positioning the outboard blade section at an end position means that the outboard blade section is kept in this fixed position throughout the alignment procedure and the joining procedure. In other words, the outboard blade section is fixed to the predefined end position until the inboard and outboard blade sections are fully aligned with each other and joined with each other by a suitable joining process e.g., a mechanical connection such as a bolted connection, an adhesive connection and/or a laminated connection.

In step b), the inboard blade section is positioned such that it is movable with respect to the fixed outboard blade section.

In step b), the inboard blade section may be positioned adjacent to the outboard blade section such that the inboard and outboard blade sections abut to each other. Alternatively, the inboard blade section may be positioned adjacent to the outboard blade section such that a small gap remains between the inboard and outboard blade sections for maneuvering the inboard blade section.

The nominal position of the blade root plane with respect to the blade tip is, for example, a nominal position according to a CAD model of the assembled blade.

According to a further embodiment, in step c), a vector is determined pointing from the inboard end portion towards a predicted position of the outboard end portion, the predicted position being predicted based on the current position of the inboard end portion and assuming an assembled blade, and wherein, in step d), the inboard blade section is moved relative to the outboard blade section until the vector points towards the actual position of the outboard end portion of the outboard blade section.

By determining the vector pointing from the inboard end portion and moving the inboard blade section until the vector points towards the actual position of the outboard end portion of the fixed outboard blade section, the complexity of the global alignment procedure can be further reduced and the accuracy of the alignment of the blade sections increased.

According to a further embodiment, in step c) of the method, a vector is determined pointing from the blade root plane towards a predicted position of the blade tip, the predicted position being predicted based on the current position of the blade root plane and assuming an assembled blade, and wherein, in step d), the inboard blade section is moved relative to the outboard blade section until the vector points towards the actual position of the blade tip of the outboard blade section.

By determining the vector pointing from the blade root plane and moving the inboard blade section until the vector points towards the actual position of the blade tip of the fixed outboard blade section, the complexity of the global root-to-tip alignment procedure can be further reduced and the accuracy of the alignment of the blade sections increased.

The vector is, in particular, pointing from a center of the blade root plane towards the predicted position of a hypothetical blade tip.

Further, the current position of the blade root plane is, in particular, measured. The current position of the blade root plane is measured, for example, by means of reference points and/or alignment markers on the blade root plane. The reference points and/or alignment markers are, for example, markers on the annular edge of the root portion of the inboard blade section.

Based on the measured current position of the blade root plane the position of a hypothetical blade tip is predicted by assuming an already aligned and assembled blade with a nominal geometry, for example according to a CAD model.

Furthermore, the actual position of the actual blade tip of the outboard blade section is, for example, measured with respect to the coordinate system of the blade root plane. Further, the measured actual position of the actual blade tip may be compared to the predicted position of the hypothetical blade tip.

In embodiments, the vector pointing from the inboard end portion, e.g., the blade root plane, towards the predicted position of the outboard end portion, e.g., the blade tip, is a three-dimensional vector.

According to a further embodiment, the outboard blade section is kept fixed at the predefined end position and the inboard blade section is moved relative to the fixed outboard blade section in six degrees of freedom.

In particular, the inboard blade section is moved relative to the fixed outboard blade section with respect to three translational degrees of freedom, namely parallel to a first direction pointing from a leading edge to a trailing edge of the blade, parallel to a second direction which is a height direction pointing from a suction side to a pressure side of the blade, and parallel to a third direction which is a longitudinal direction (spanwise direction) of the blade from the blade root to the blade tip. Furthermore, the inboard blade section is moved relative to the fixed outboard blade section with respect to three rotational degrees of freedom, namely by rotation around the first, second and third directions.

According to a further embodiment, the inboard blade section is moved relative to the outboard blade section by, firstly, moving the inboard blade section with respect to three rotational degrees of freedom, and by, secondly, moving the inboard blade section with respect to three translational degrees of freedom while keeping the rotational degrees of freedom fixed.

Thus, the inboard blade section is moved in two separate steps. In the first step, the inclination of the root plane is brought in a nominal position. In the second step, the inboard blade section is moved by a pure translation movement.

In embodiments, the vector pointing from the blade root plane towards the predicted position of the blade tip may be determined before or after bringing the inclination of the root plane in the nominal position.

According to a further embodiment, in step c), the deviation is determined by using alignment markers on the inboard blade section and/or on the outboard blade section and means for marker recognition.

Thus, the alignment can be carried out without necessarily matching any structural features of the blade sections (such as female and male parts etc.) in a connection region with each other and/or without using an extra joining portion. Hence, the alignment procedure is simplified.

The alignment markers are, for example, placed on the respective blade section after manufacturing the blade section. The alignment markers are, for example, attached to the outer surface of the respective blade section. In examples, the alignment markers may be reflectors attached to the outer surface of the respective blade section. The alignment markers may be also, for example, painted on the outer surface of the blade section.

Alternatively, the alignment markers are, for example, casted in the blade sections during manufacturing of the respective blade section. In this case, a manual placement of alignment markers after the manufacturing of the respective blade section is not required. The alignment markers are, for example, imprinted onto the outer surface of the respective blade section. A so-called mould division line (or several such lines) may also be used as an alignment marker. A mould division line is a residual feature from a moulding process of the respective blade section in a mould comprising an upper and a lower mould part for moulding an upper and lower shell of the blade section and/or a line arising out of two half blade shells joined together e.g. by adhesion.

The means for marker recognition comprise, for example, a laser measurement device. The means for marker recognition comprise, for example, a laser scanner. The means for marker recognition may also comprise any other recognition system that allows a rapid recognition of the alignment markers.

According to a further embodiment, in step c), the current position of the blade root plane is determined by means of at least three reference points on the blade root plane.

The reference points on the blade root plane are, for example, three or more drilling holes drilled into the annular edge of the root portion of the inboard blade section. The drilling holes may be applied to the root portion of the inboard blade section during manufacturing of the inboard blade section. The drilling holes are, in particular as the case may be, configured for a connection of the inboard blade section with the hub. Such connection may however also be provided using (hollow) root inserts and studs commonly used for establishing a bolted connection between a blade and a hub. The inserts can be provided also by drilling holes into the annular edge of the root portion of the inboard blade section and placing the inserts in the holes. In alternative, the inserts can be pre-mounted as part of the blade casting process. Nonetheless, these insert holes may equally be used as reference points.

By using said holes, e.g drilling or blade insert holes, as reference points for determining the position of the blade root plane no additional markers need necessarily to be placed.

According to a further embodiment, the method comprises, after step d), the steps of re-assessing an alignment of the inboard blade section with respect to the outboard blade section in a connection region of the blade sections by means of alignment markers on the inboard blade section in the connection region, alignment markers on the outboard blade section in the connection region and means for marker recognition, and moving the inboard blade section in the connection region according to a result of the re-assessment.

Re-assessing the alignment of the inboard and outboard blade sections with each other in the connection region allows a local assessment of the alignment of the blade sections in the connection region. Thus, after it is ensured that the global (e.g., root-to-tip) alignment is achieved within given tolerances, any remaining local misalignment at the split plane between the two blade sections can be eliminated. This is done by moving the inboard blade section, for example, predominantly or only in the connection region.

The alignment markers are, for example, configured similar as the alignment markers described with respect to step c) above and are placed on the respective blade section in a similar manner as described there.

Further, the means for marker recognition are, for example, configured similar as the means for marker recognition described with respect to step c) above.

According to a further embodiment, the inboard blade section is moved in the connection region according to the result of the re-assessment only with respect to first and second translational directions and a rotation around a third direction while keeping the other translational and rotational degrees of freedom fixed, and wherein the first direction is parallel to a direction from a leading edge to a trailing edge of the blade, the second direction is a height direction, and the third direction is parallel to a longitudinal direction of the blade.

Thus, the local alignment in the connection region is performed by moving the inboard blade section only in height and in the direction of the leading/trailing edge and by adjusting the twist of the inboard blade section (i.e. by rotating the inboard blade section around the longitudinal axis of the blade).

According to a further embodiment, after moving the inboard blade section in the connection region according to the result of the re-assessment, steps c) and d) are repeated.

Thus, after the local alignment in the connection region a further final global (e.g., root-to-tip) alignment is carried out. This allows to remove any remaining global (e.g., root-to-tip) misalignment which might have been introduced during the local alignment procedure.

According to a further embodiment, in step a), the outboard blade section is positioned by positioning an outboard support structure according to a predefined position, and positioning the outboard blade section on the outboard support structure by means of alignment markers on the outboard blade section.

The alignment markers are, for example, configured similar as the alignment markers described with respect to step c) above and are and are placed on the respective blade section in a similar manner as described there.

Further, the alignment markers are, for example, scanned by using means for marker recognition. The means for marker recognition are, for example, configured similar as the means for marker recognition described with respect to step c) above.

According to a further embodiment, in step b), the inboard blade section is positioned by positioning an inboard support structure according to a predefined position with respect to the outboard support structure and/or the outboard blade section, and positioning the inboard blade section on the inboard support structure by means of alignment markers on the inboard blade section.

The inboard blade section is positioned, for example, by means of a crane or other lifting tool. The inboard blade section is positioned, for example, with respect to the first, second and third translation direction.

The alignment markers are, for example, configured similar as the alignment markers described with respect to step c) above and are placed on the respective blade section in a similar manner as described there.

Further, the alignment markers are, for example, scanned by using means for marker recognition. The means for marker recognition are, for example, configured similar as the means for marker recognition described with respect to step c) above.

According to a further embodiment, the inboard support structure comprises adjusting screws, jacks and/or rails, and wherein:

the inboard blade section is moved by means of the adjusting screws parallel to a first direction pointing from a leading edge to a trailing edge of the blade, the inboard blade section is moved by means of the jacks parallel to a second direction being a height direction, and/or the inboard blade section is moved by means of the rails parallel to a third direction being a longitudinal direction of the blade.

In embodiments, the method comprises, after step d), the step of joining the inboard and outboard blade sections, for example by means of a mechanical connection such as a bolted connection, an adhesive connection and/or a laminated connection, e.g. by an infusion process or hand lamination. For example, vacuum infusion of a dry fiber lay-up in a joining region of the inboard and the outboard blade sections with resin may be applied.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
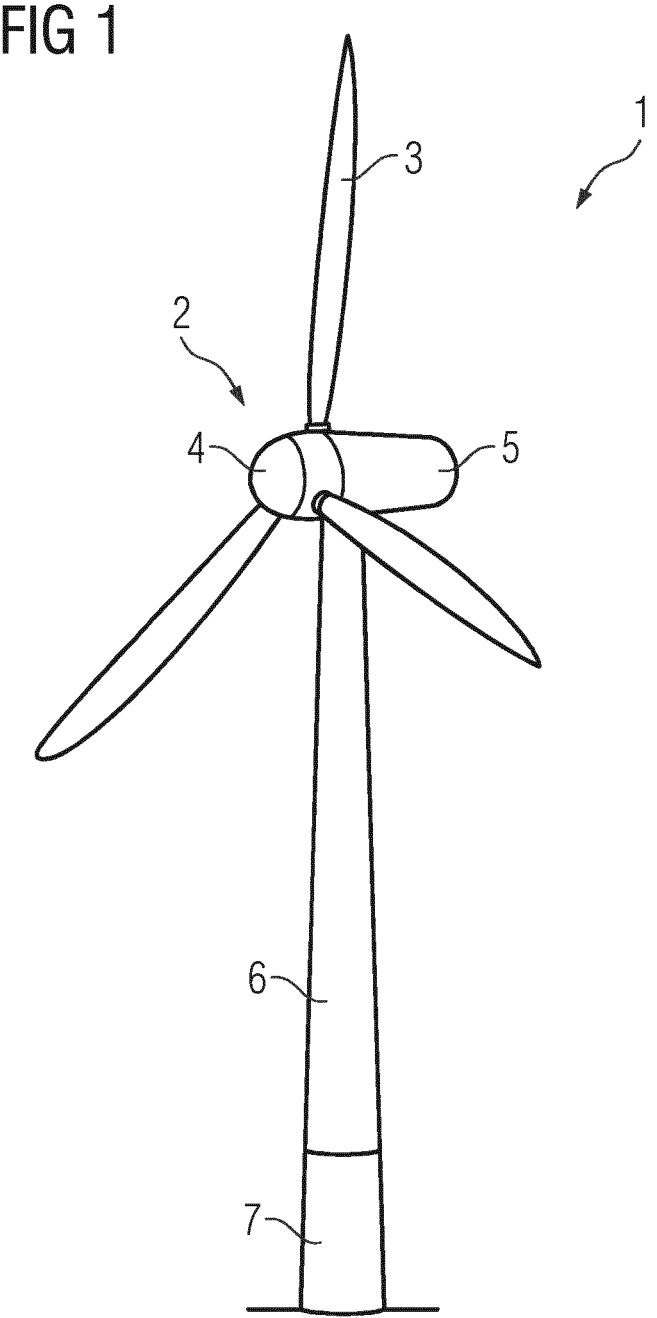
FIG. 1 shows a wind turbine according to an embodiment.

In the Figures, like reference numerals designate like or functionally equivalent elements, unless otherwise indicated.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a concrete foundation or a monopile driven into the ground or seabed.

Figure 2:
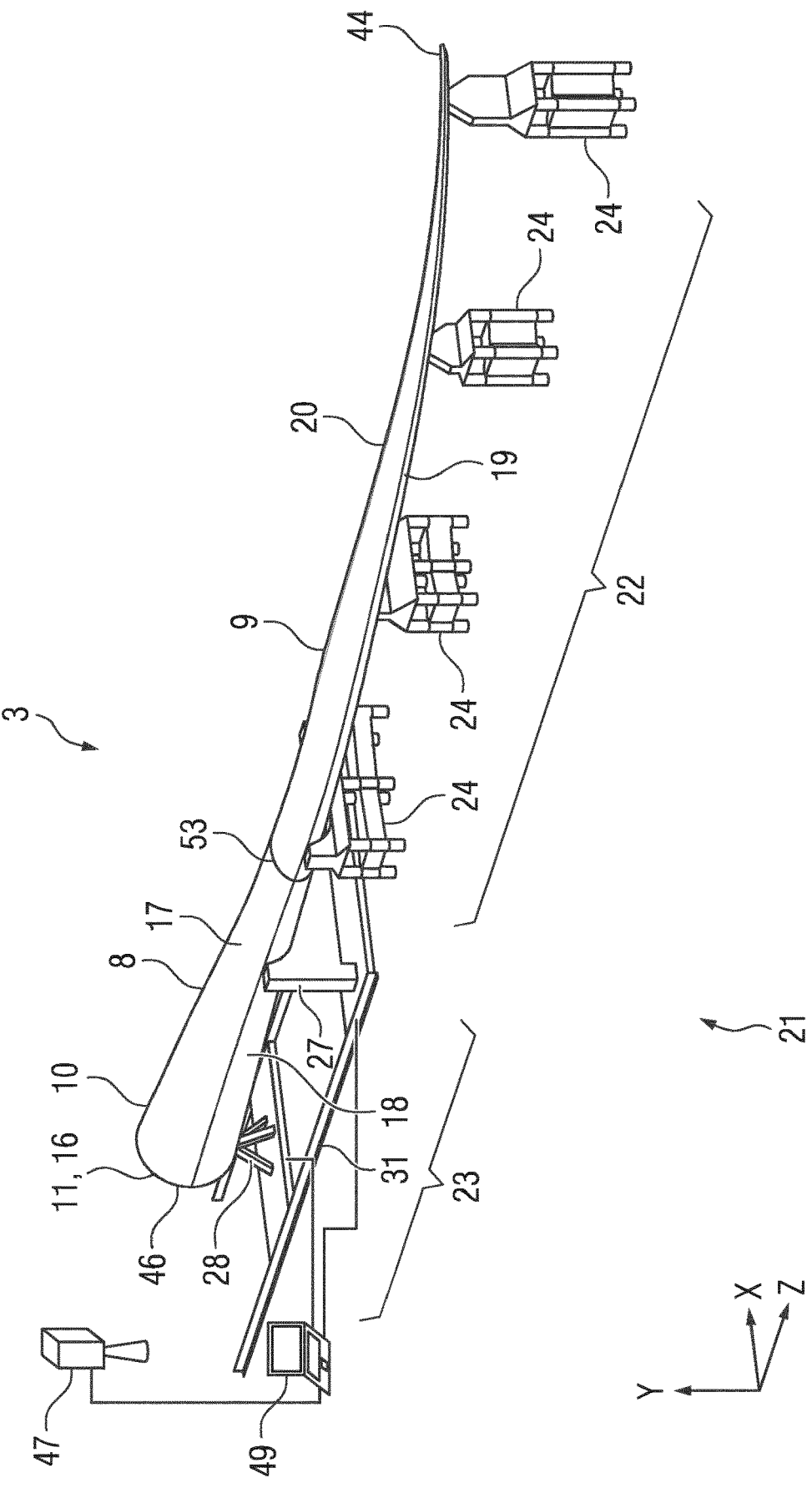
FIG. 2 shows a blade of the wind turbine of FIG. 1 arranged on an alignment tool during an assembling process of the blade.

FIG. 2 shows one of the blades 3 of the wind turbine 1 of FIG. 1 during an assembling process.

As shown in FIG. 2, at least one of the blades 3 of the wind turbine 1 is manufactured from two individual lengthwise blade sections 8, 9. In particular, each of the blades 3 is assembled by aligning and joining an inboard blade section 8 and an outboard blade section 9 with each other.

Figure 3:
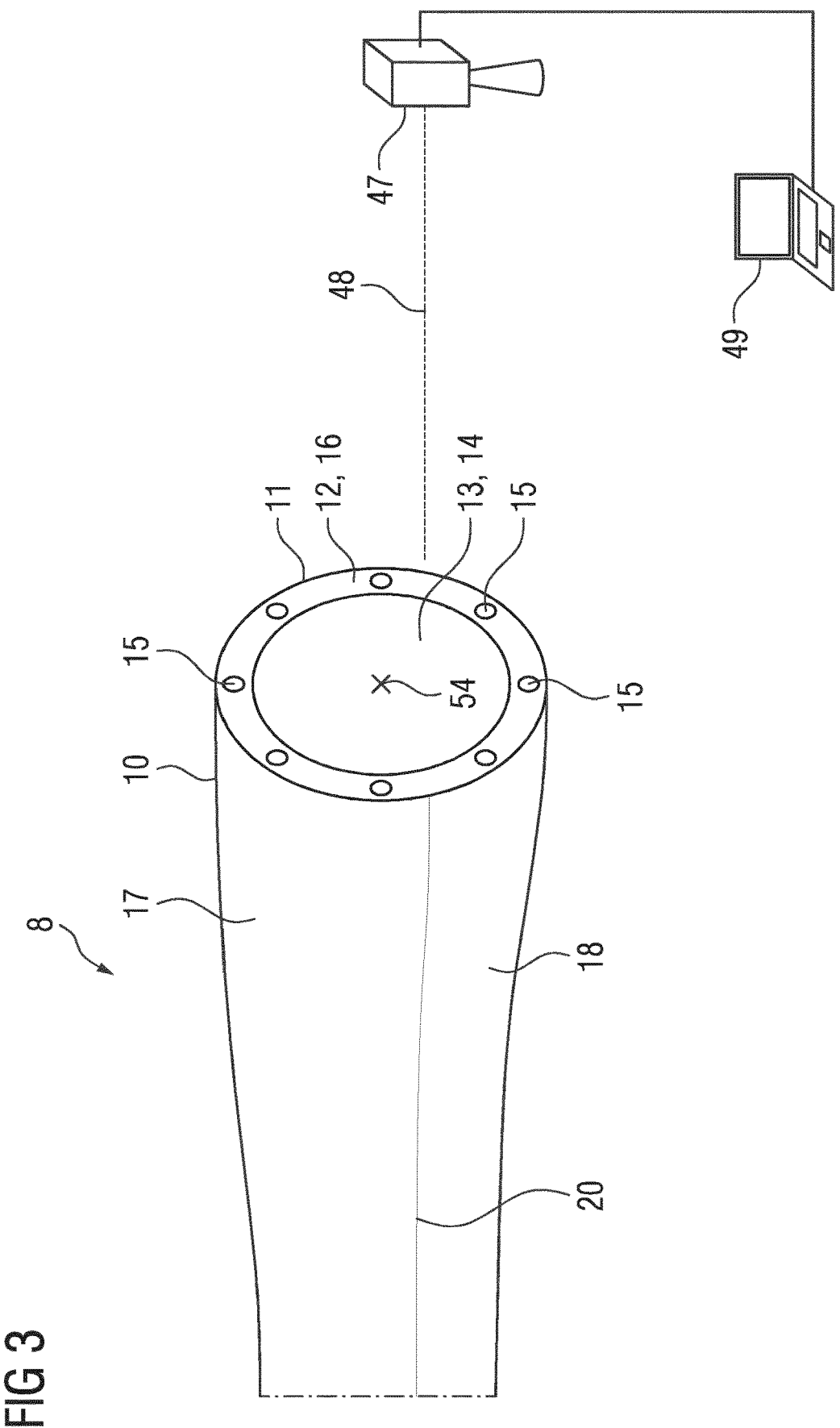
FIG. 3 shows a portion of an inboard blade section of the blade of FIG. 2.

The inboard blade section 8 comprises an essentially cylindrical root portion 10. As shown in FIG. 3, the root portion 10 comprises at its inboard end 11 an annular edge 12. The annular edge 12 surrounds an opening 13 of an inner cavity 14 of the blade 3. Furthermore, the annular edge 12 in this example comprises several drilling holes 15, some of them have been denoted with a reference sign in FIG. 3. The drilling holes 15 are configured for connecting the inboard blade section 8 with the rotor hub 4 (FIG. 1), for example by bolting. Using root inserts, e.g. hollow inserts with an inner thread, to accommodate a stud can equally be used for a bolted blade and hub connection. Such inserts may be pre-placed in advance as part of the blade casting process.

The blade sections 8 and 9 are each made, for example, from a fiber-reinforced resin laminate. The blade sections 8, 9 have been, for example, manufactured by infusing a dry fiber lay-up in a mould with resin by a vacuum infusion process (not shown). However, the blade sections 8, 9 may have been manufactured also in a different way.

At a later stage of the manufacturing process of the inboard blade section 8, the inboard end 11 of the inboard blade section 8 has been machined, to the extend necessary, such that the annular edge 12 (FIG. 3) lies in an even predefined plane. Then, the holes 15 have been drilled into the annular edge 12, as shown in FIG. 3.

The annular edge 12 of the essentially cylindrical root portion 10 defines a blade root plane 16 having a center 54 at the center of the essentially circular cross-section of the root portion 10.

At least three of the drilling holes 15 may be used for measuring the position of the blade root plane 16 during the alignment process of the inboard blade section 8 with respect to the outboard blade section 9.

Apart from the (cylindrical) root portion 10 configured for connection with the hub 4, the wind turbine blade 3 has an aerodynamically shaped cross-section that most commonly changes in shape along the blade or blade section in spanwise direction (airfoil(s)). As shown in FIG. 2, the wind turbine blade 3, i.e. each of its blade sections 8, 9, comprises, for example, a pressure side 17 (upwind side) and a suction side 18 (downwind side). The pressure side 17 and the suction side 18 are connected with each other at a leading edge 19 and a trailing edge 20. The pressure and suction sides 17, 18 and the leading and trailing edges 19, 20 define the interior cavity 14 (FIG. 3) of the wind turbine blade 3.

During assembling of the blade 3, the inboard blade section 8 and the outboard blade section 9 are aligned with each other by using an alignment tool 21 (FIG. 2). The alignment tool 21 comprises an outboard support structure 22 for positioning the outboard blade section 9 at a fixed position. Further, the alignment tool 21 comprises an inboard support structure 23 for positioning the inboard blade section 8 and for moving the inboard blade section 8 with respect to the fixed outboard blade section 9.

By means of the inboard support structure 23 (FIG. 2), the inboard blade section 8 can be moved in six degrees of freedom (X, Y, Z, Rotx, Roty, Rotz) with respect to the fixed outboard blade section 9. In particular, the inboard blade section 8 can be moved relative to the fixed outboard blade section 9 with respect to three translational degrees of freedom (X, Y, Z), namely parallel to a first direction X pointing from the leading edge 19 to the trailing edge 20 of the blade 3, parallel to a second direction Y which is a height direction, and parallel to a third direction Z which is a longitudinal direction of the blade 3 pointing towards a blade tip 44 of the blade 3. Furthermore, the inboard blade section 8 can be moved relative to the fixed outboard blade section 9 with respect to three rotational degrees of freedom, namely by rotation (Rotx, Roty, Rotz) around the first, second and third directions X, Y and Z.

Figure 4:
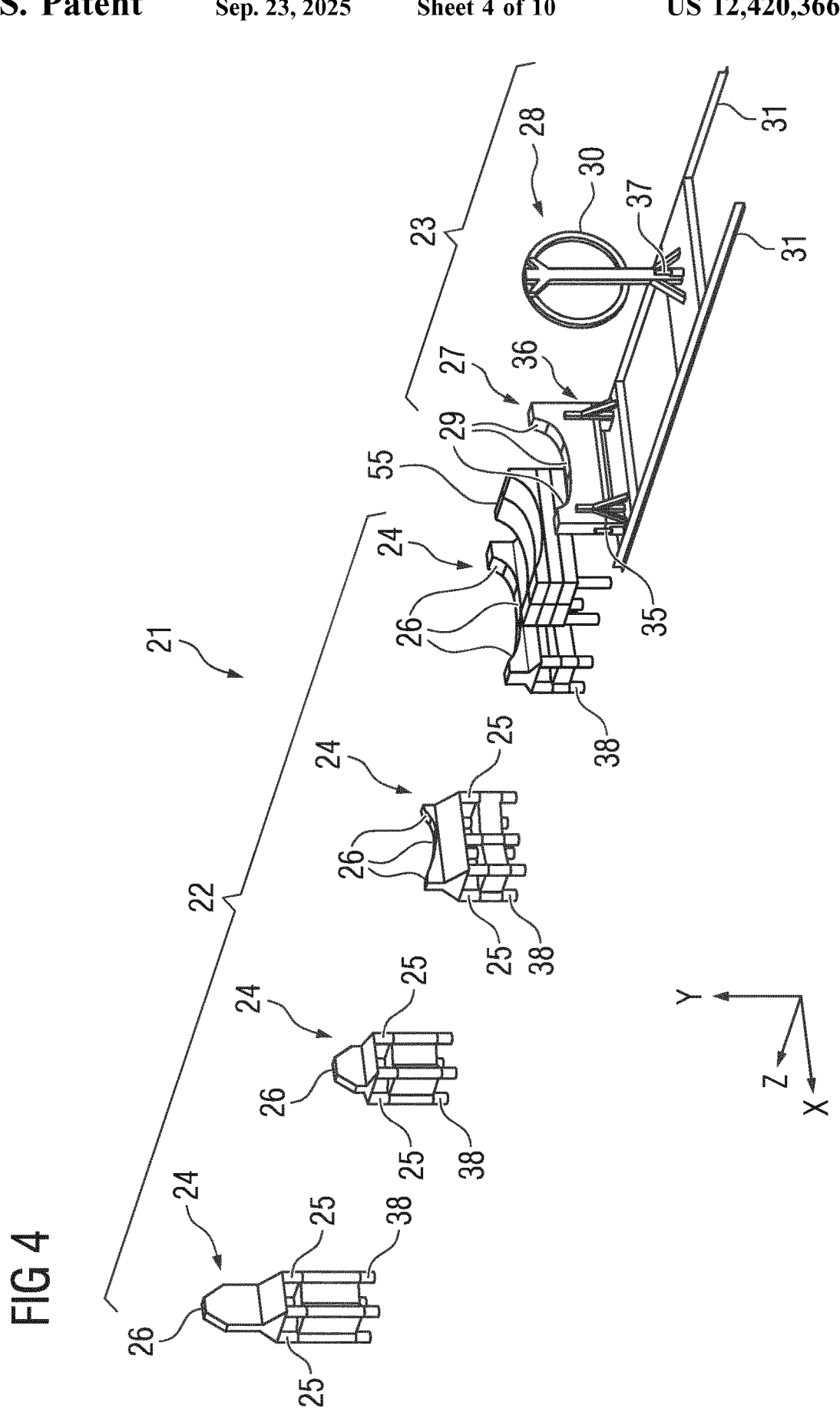
FIG. 4 shows the alignment tool of FIG. 2.

As shown in FIG. 4, the outboard support structure 22 comprises several outboard supports 24 (four in the shown example). Each outboard support 24 comprises several adjustable feet 25 which can be adjusted in the height direction Y. The adjustable feet 25 of the outboard supports 24 comprises, for example, adjusting screws. Furthermore, each outboard support 24 comprises one or more supporting surfaces 26 for supporting the outboard blade section 9 (FIG. 2).

Figure 8:
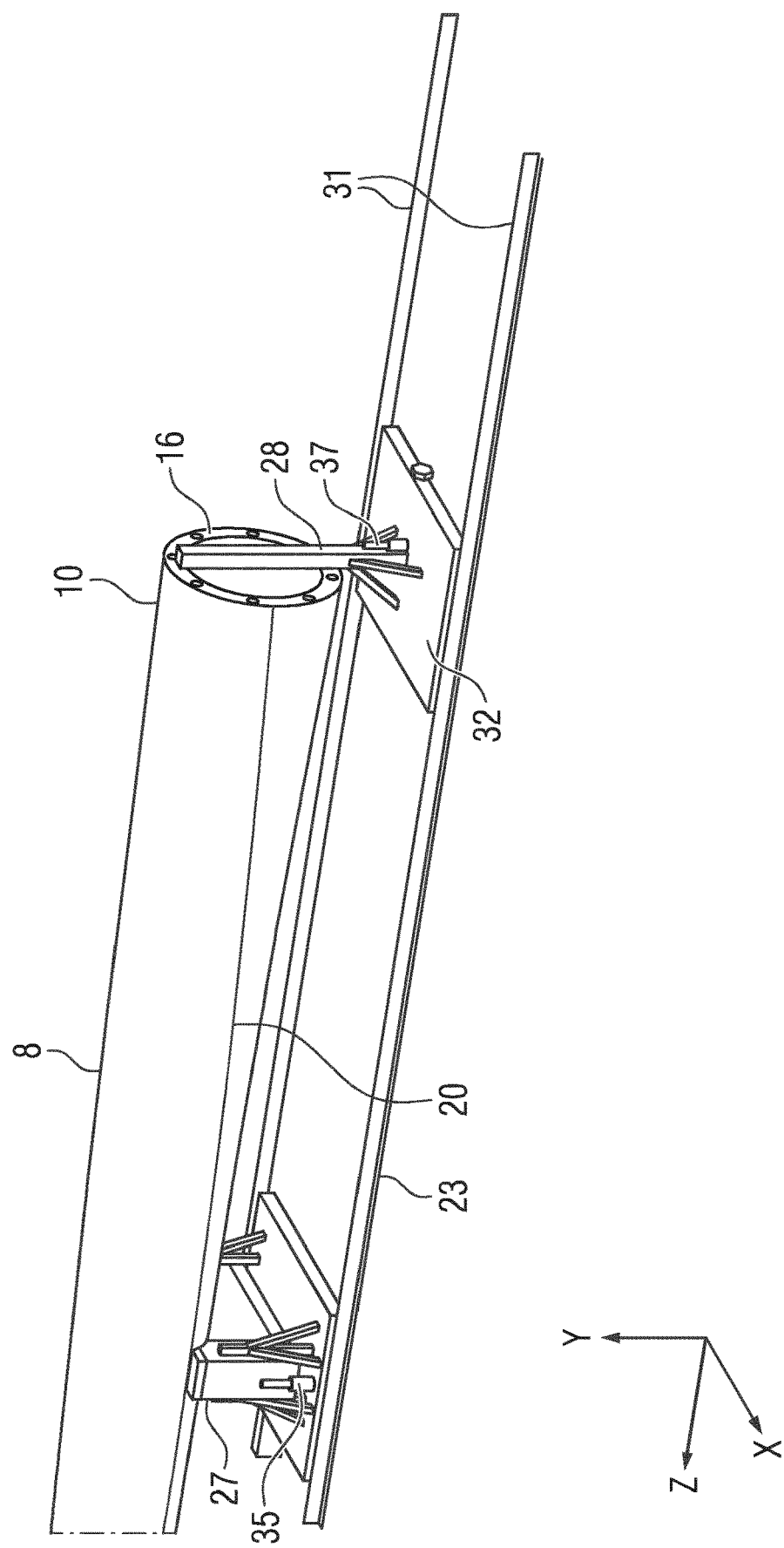
FIG. 8 shows a view similar as FIG. 5 but with the inboard blade section arranged on the inboard support structure.
Figure 9:
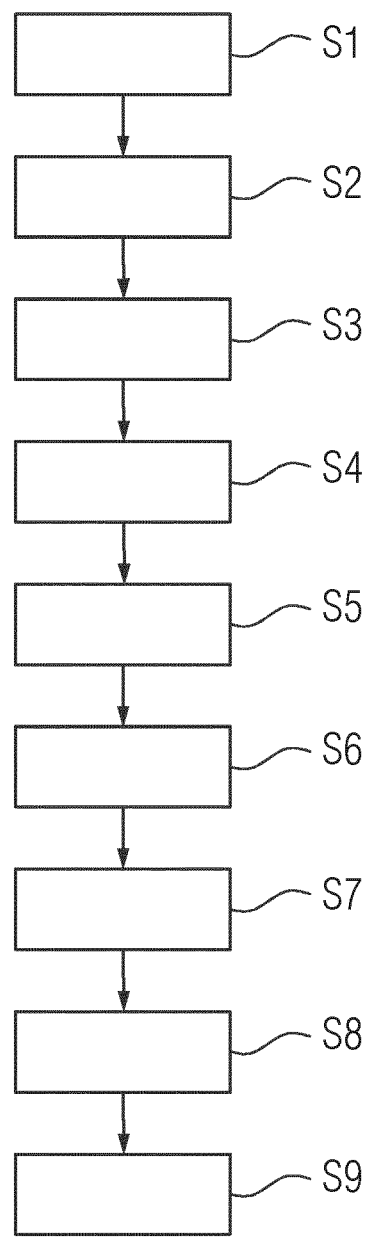
FIG. 9 shows a flowchart illustrating a method for assembling the inboard and outboard blade sections of the blade of FIG. 2 according to an embodiment.

As shown in FIG. 4, the inboard support structure 23 comprises several inboard supports 27, 28 each having one or more supporting surfaces 29 and/or attachment means 30 for supporting the inboard blade section 8 (FIGS. 2 and 8). In the shown example, the inboard support structure 23 comprises an inboard support 27 having three supporting surfaces 29 for laying the inboard blade section 8 on these supporting surfaces 29. The inboard support 27 is arranged close to the outboard support structure 22. Furthermore, the inboard support structure 23 in the shown example comprises an inboard support 28 comprising attachment means 30 in form of a ring 30. The ring 30 of the inboard support 28 can be attached, e.g., bolted, to the annular edge 12 (FIG. 3) of the inboard blade section 8.

Figure 5:
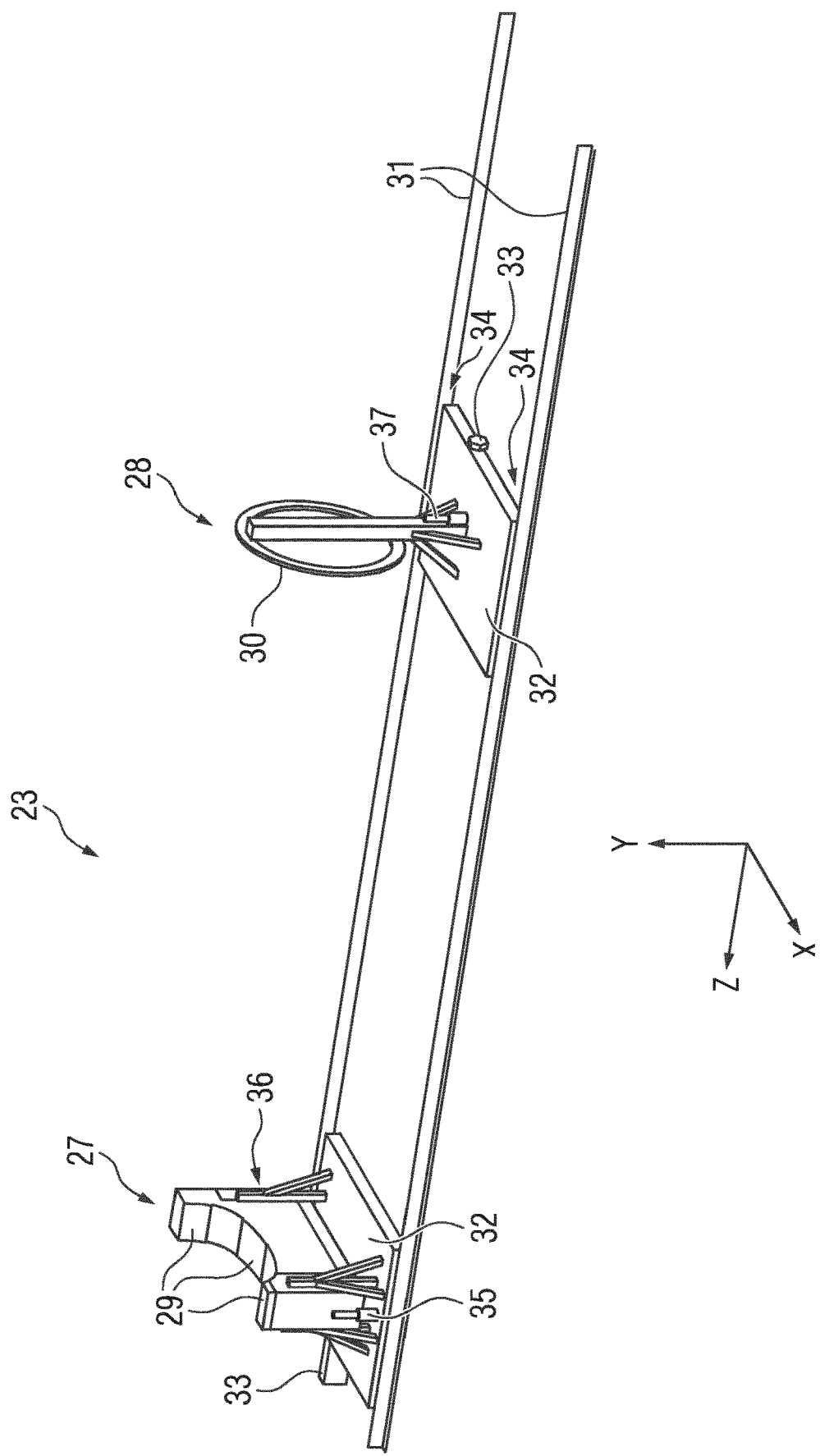
FIG. 5 shows an inboard support structure of the alignment tool of FIG. 4.
Figure 6:
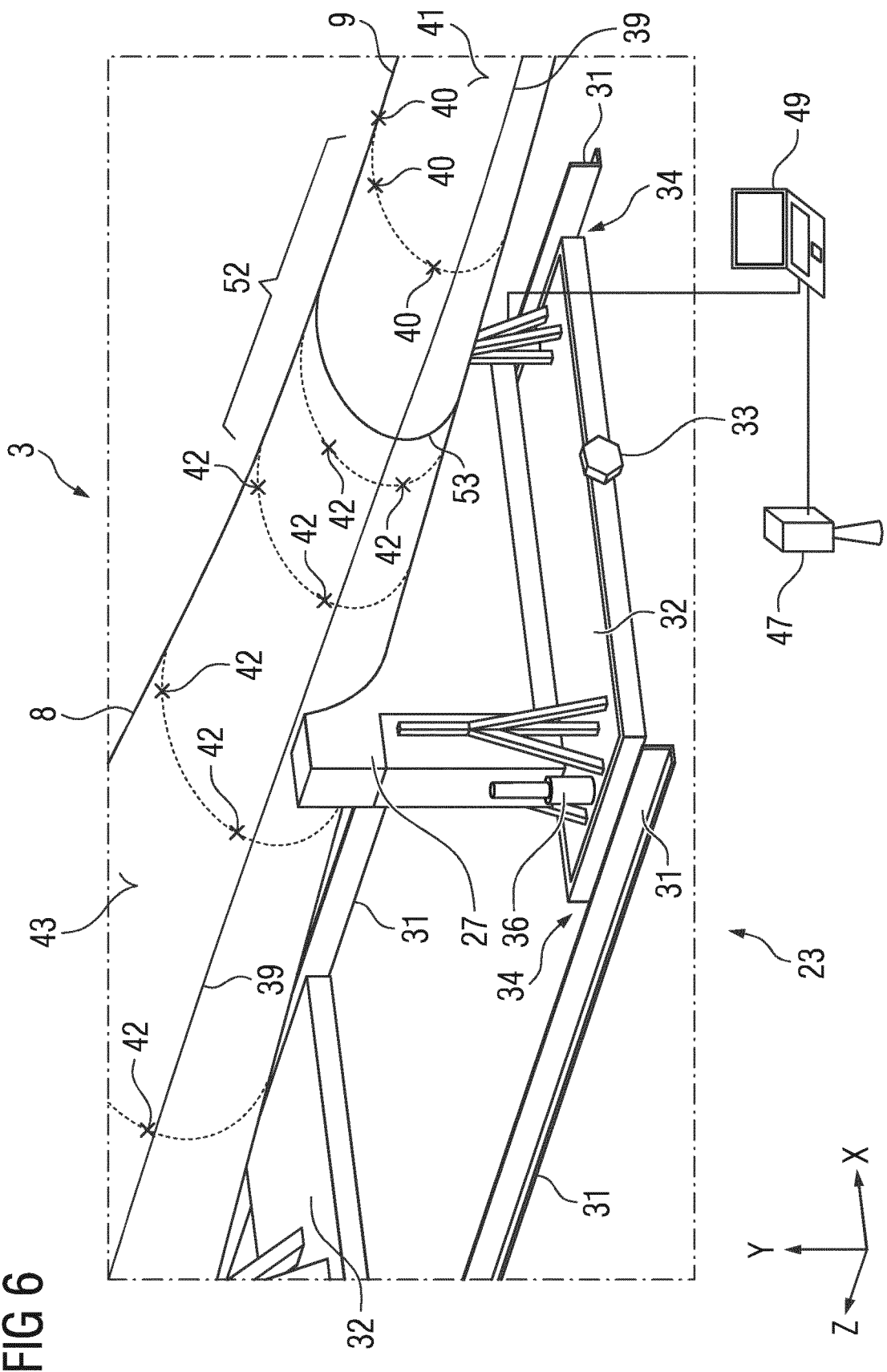
FIG. 6 shows a detailed partial view of FIG. 2 around a connection region of inboard and outboard blade sections of the blade of FIG. 2.

The inboard support structure 23 comprises in addition rails 31 (FIG. 4) for moving the inboard blade section 8 parallel to the longitudinal direction Z of the blade 3. Furthermore, each of the inboard supports 27, 28 is based on a platform 32 (FIG. 5) that can be moved by means of adjusting screws 33 in the first direction X which is perpendicular to the longitudinal direction Z of the blade 3 and to the height direction Y. FIG. 6 shows the platforms 32 each disposed between the two rails 31, wherein a gap 34 is arranged between each platform 32 and each rail 31 for moving the respective platform 32 in the X direction by means of the adjusting screws 33.

Furthermore, each inboard support 27, 28 (FIG. 4) comprises one or more jacks 35, 36, 37 which can be actuated independent from each other to jack-up the inboard blade section 8 and position it. The jacks 35, 36, 37 are configured for moving the inboard blade section 8 in the height direction Y and rotating the inboard blade section 8 around the first and third direction X, Z (Rotx, Rotz).

Thus, with the shown alignment tool 21 (FIGS. 2 and 4), the inboard blade section 8 can be moved in six degrees of freedom with respect to the fixed outboard blade section 9.

In the following, a method for manufacturing the blade 3, in particular for aligning the blade sections 8, 9, is described with respect to FIGS. 2 to 9.

In step S1 of the method, the outboard support structure 22 (FIG. 4) is positioned according to a predefined position.

In the shown example, the outboard support structure 22 comprises four outboard supports 24. However, also more or less than four outboard supports 24 can be used, e.g. in dependency of the blade section length and/or weight. Feet 38 of each outboard support 24 are positioned on predefined positions in X and Z direction, for example on the floor of a manufacturing hall. Then, the adjustable feet 25 of the outboard supports 24 are adjusted in the height direction Y. Hence, the outboard support structure 22, in particular the support surfaces 26 of the outboard support structure 22, are positioned on predefined positions with respect to the X, Y and Z direction.

In step S2 of the method, the outboard blade section 9 is positioned on the outboard support structure 22 (FIG. 2). The outboard blade section 9 is, for example, positioned on the outboard support structure 22 by means of a crane (not shown).

In particular, the outboard blade section 9 is aligned with respect to the outboard supports 24 by means of alignment markers 39, 40 (FIG. 6) on the outer surface 41 of the outboard blade section 9. In the shown example, alignment markers 40 (FIG. 6) are used for positioning the outboard blade section 9 as predefined with respect to the Z direction on the outboard supports 24 (FIG. 2). The alignment markers 40 (FIG. 6) are, for example, imprinted or painted onto the outer surface 41 of the outboard blade section 9. In the shown example, the alignment markers 40 are placed along the outboard blade section 9 at certain, possibly pre-defined, locations.

Further, in the shown example, a mould division line 39 (FIG. 6) is used as further alignment marker for positioning the outboard blade section 9 as predefined with respect to the Rotz direction on the outboard supports 24. The mould division line 39 is a residual feature from a moulding process of the blade sections 8, 9. In particular, the mould division line 39 is casted into the outer surfaces 41, 43 of the blade sections 8, 9 as a residual effect of the moulding process where an upper and a lower mould part (not shown) are connected with each other. It may however also be one or more bond line(s) arising when adhering two blade half shells to one another.

In other examples, also other types of alignment markers than the markers 39, 40 may be used.

In step S3 of the method, the inboard support structure 23 (FIG. 4) is positioned.

In the shown example, the inboard support structure 23 comprises two inboard supports 27, 28 on rails 31. The inboard support structure 23 is positioned on a predefined position in X and Z direction with respect to the outboard support structure 22, for example on the floor of a manufacturing hall. Then, the jacks 35, 36, 37 of the inboard supports 27, 28 are adjusted in the height direction Y. Hence, the inboard support structure 23, in particular the support surfaces 29 and the attachment means 30 (ring 30) of the inboard support structure 23, are positioned on predefined positions with respect to the X, Y and Z direction.

In step S4 of the method, the inboard blade section 8 (FIGS. 2 and 8) is positioned on the inboard support structure 23. The inboard blade section 8 is, for example, positioned on the inboard support structure 23 by means of a crane or other lifting tools (not shown).

In particular, the inboard blade section 8 is aligned with respect to the inboard supports 27, 28 by means of alignment markers 42 (FIG. 6) on the outer surface 43 of the inboard blade section 8. In the shown example, alignment markers 42 imprinted or painted onto the outer surface 43 of the inboard blade section 8 as well as the mould division line 39 (FIG. 6) are used as alignment markers in a similar manner as in step S2 for the outboard blade section 9. Furthermore, the annular edge 12 (FIG. 3) at the root portion 10 of the inboard blade section 8 is bolted to the ring 30 (FIG. 4) of the inboard support structure 23.

In step S5 and S6 of the method a global alignment of the inboard and outboard blade sections 8, 9 is performed. During this global alignment, the blade root plane 16 (FIG. 2) of the inboard blade section 8 is aligned with respect to the blade tip 44 of the outboard blade section 9.

For the global alignment, in step S5, a current position 45 (FIG. 7) of the blade root plane 16 of the moveable inboard blade section 8 is determined with respect to the blade tip 44 of the fixed outboard blade section 9. Further, a deviation of the determined current position 45 of the blade root plane 16 from a nominal position 46 (FIG. 2) of the blade root plane 16 is determined.

In detail, the current position 45 (FIG. 7) of the blade root plane 16 is measured, for example, by means of reference points 15 (FIG. 3) on the blade root plane 16. In the shown example, the drilling holes 15 on the annular edge 12 of the root portion 10 of the inboard blade section 8 are used as reference points to determine the current position 45 of the blade root plane 16.

For example, the current three-dimensional position 45 of the blade root plane 16 is measured by means of a measurement device 47 (FIG. 3). The measurement device 47 comprises, for example, a means for marker recognition. The measurement device 47 is, for example, a laser scanner emitting a measurement radiation 48. The measurement device 47 is, for example, connected to a control unit 49. The control unit 49 is, for example, configured for determining the current position 45 based on measurement data from the measurement device 47.

Based on the measured current position 45 (FIG. 7) of the blade root plane 16 a position 50' of a hypothetical blade tip 44' of a hypothetical outboard blade section 9' is predicted by assuming an already aligned and assembled blade 3 with a nominal geometry, for example according to a CAD model.

Figure 7:
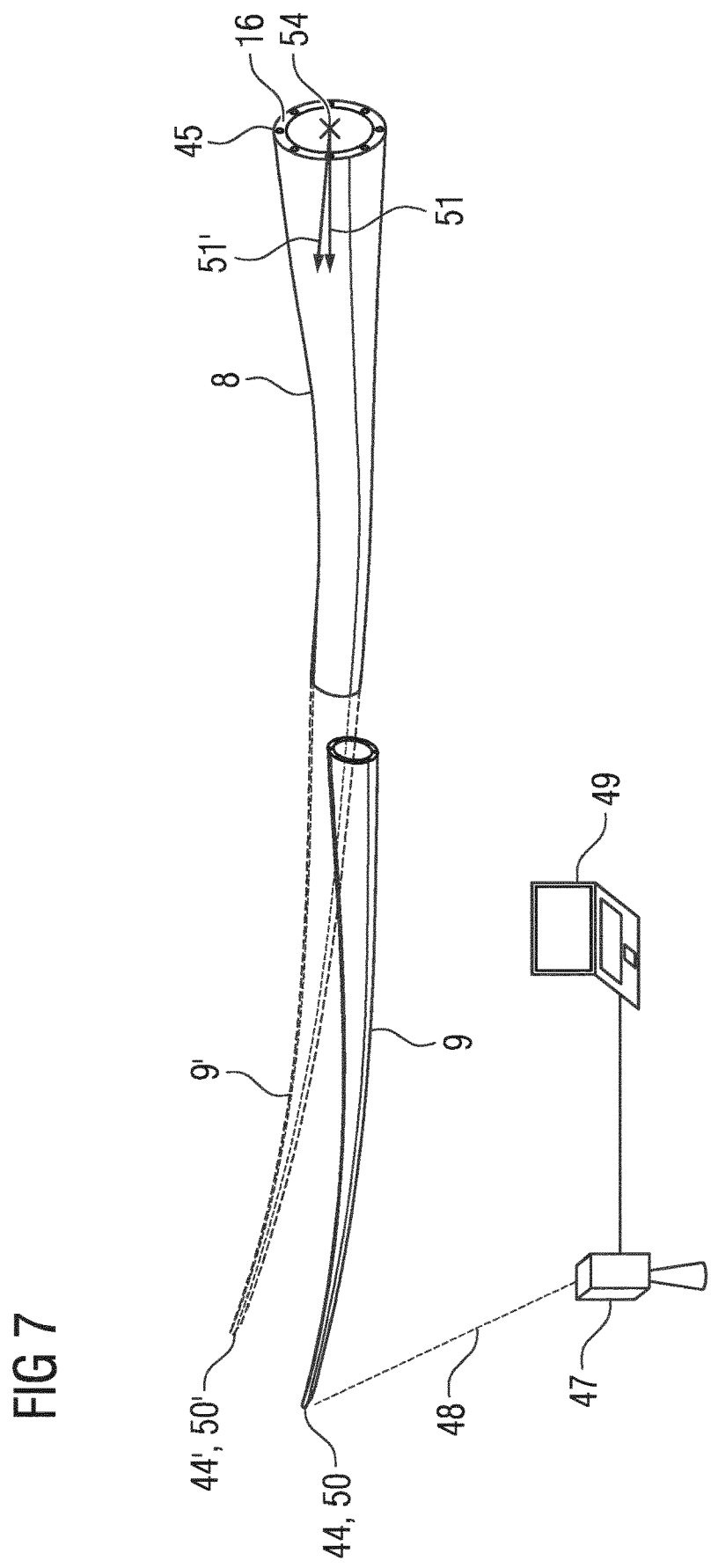
FIG. 7 illustrates a global tip to root alignment of the inboard and outboards blade sections of the blade of FIG. 2.

Furthermore, the actual position 50 of the actual blade tip 44 of the fixed outboard blade section 9 is measured with respect to the coordinate system of the blade root plane 16. For example, the actual position 50 of the blade tip 44 is measured based on markers on the blade tip 44 similar as the markers 40 shown in FIG. 6. Furthermore, the actual position 50 of the blade tip 44 is measured, for example, by means of a measurement device 47. The measurement device 47 comprises, for example, a means for marker recognition. The measurement device 47 is, for example, a laser scanner. Further, the actual position 50 of the blade tip 44 is determined, for example, by using a control unit 49 (FIG. 7). The control unit 49 is, for example, determining the actual position 50 of the blade tip 44 in the coordinate system of the blade root plane 16.

Then, the measured actual position 50 of the actual blade tip 44 is compared with the predicted position 44' of the hypothetical blade tip 9' (FIG. 7).

In particular, a vector 51' pointing from the center 54 of the blade root plane 16 (i.e. of the blade root plane 16 at the current position 45) towards the predicted position 50' of the hypothetical blade tip 44' is determined.

In step S6 of the method, the inboard blade section 8 is moved relative to the fixed outboard blade section 9 to compensate for the determined deviation between the current position 45 of the blade root plane 16 and a nominal position 46 (FIG. 2) of the blade root plane 16.

In particular, the inboard blade section 8 is moved relative to the fixed outboard blade section 9 until the vector 51' (FIG. 7) points towards the actual position 50 of the blade tip 44 of the fixed outboard blade section 9. The vector pointing towards the actual position 50 of the blade tip 44 is denoted with a reference sign 51 in FIG. 7.

In particular, the inboard blade section 8 is moved by using the rails 31, the adjusting screws 33 and the jacks 35, 36, 37 of the inboard support structure 23 (FIG. 4). In detail, the rails 31 are used for a translation along the Z direction (longitudinal direction of the blade 3). The adjusting screws 33 are used for a translation along the X direction (pointing from the leading edge 19 to the trailing edge 20) and for a rotation around the Y direction (Roty). Furthermore, the jacks 35, 36, 37 are used for adjusting the height (Y direction) and for a rotation around the X direction (Rotx) and the Z direction (Rotz). In particular, each of the jacks 35, 36 and 37 can be actuated independent from the others.

The inboard support structure 23 is, for example, connected to a control unit 49 (FIG. 2). In particular, actuators (not shown) of the rails 31, the adjusting screws 33 and/or the jacks 35, 36, 37 may be controlled by the control unit 49. Further, the actuators (not shown) of the rails 31, the adjusting screws 33 and/or the jacks 35, 36, 37 may be controlled based on the measured current position 45 of the root plane 16, the measured current position 50 of the blade tip 44, the determined deviation of the measured current position 45 from a nominal position and/or based on the determined vector 51' (FIG. 7).

In embodiments, the inboard blade section 8 may be moved in two separate steps. In the first step, the inclination of the root plane 16 is brought in a nominal position by moving the inboard blade section 8 with respect to the three rotational degrees of freedom (Rotx, Roty, Rotz). In the second step, the inboard blade section 8 is moved by a pure translation movement in X, Y and Z direction while keeping the rotational degrees of freedom (Rotx, Roty, Rotz) fixed.

In step S7 of the method, a local alignment of the inboard blade section 8 and the outboard blade section 9 with each other is performed. In particular, the alignment of the inboard blade section 8 with respect to the outboard blade section 9 is re-assessed in a connection region 52 (FIG. 6) of the blade sections 8, 9. This re-assessment may be performed by means of alignment markers 42 on the inboard blade section 8 and alignment markers 40 on the outboard blade section 9. Reference sign 53 in FIG. 6 indicates the dividing line between the inboard blade section 8 and the outboard blade section 9.

The alignment markers 40 and 42 are, for example, detected by using a measurement device 47 (FIG. 6). The measurement device 47 comprises, for example, means for marker recognition 47. The measurement device 47 comprises, for example, a laser scanner. If a deviation of a current alignment of the markers 40 and 42 with each other, i.e. of the current alignment of the inboard and outboard sections 8, 9, is detected in the connection region 52, the inboard blade section 8 is moved to compensate for the determined deviation.

For example, the inboard blade section 8 is moved in step S7 only in the connection region 52 (FIG. 6) by activating only the inboard support 27 (FIG. 5) (but not the inboard support 28) and the adjusting screw 33 of the platform 32 on which the inboard support 27 is based (but not the adjusting screw 33 of the platform 32 on which the inboard support 28 is based).

Further, the inboard blade section 8 (FIG. 2) is moved in step S7, for example, only with respect to the first and second translational directions X, Y and a rotation around the third direction Rotz while keeping the other translational and rotational degrees of freedom (Z, Rotx, Roty) fixed.

In step S8 of the method, a final global alignment may be carried out by repeating steps S5 and S6.

Hence, the inboard blade section 8 and the outboard blade section 9 are accurately aligned with each other and are ready for the joining process.

In step S9 of the method, the inboard blade section 8 and the outboard blade section 9 are joined with each other.

For example, the inboard and outboard blade sections 8, 9 are joined with each other by means of vacuum infusion of a dry fiber lay-up (not shown) in a joining region of the inboard and the outboard blade sections 8, 9 with resin. The joining region may coincide with the connection region 52 indicated in FIG. 6 or may cover a different (e.g., smaller) area around the dividing line 53 in FIG. 6.

In embodiments, the alignment tool 21 comprises in addition to the inboard support structure 23 and the outboard support structures 22 a connection support structure 55 (FIG. 4) configured for supporting the inboard and outboard blade sections 8, 9 in the connection region 52 (FIG. 6) during the joining process.

In other examples, the inboard and outboard blade sections 8, 9 may be joined with each other by a different process such as applying an adhesive or bolting.

With the described method, the complexity of the alignment procedure when aligning the lengthwise blade sections 8, 9 can be significantly reduced and the accuracy of the alignment increased, even for very long blades 3. In the described method, only the stiffer inboard blade section 8 is moved while the outboard blade section 9 which is more compliant is fixed in position. Further, moving only the inboard blade section 8 is also of advantage as the inboard blade section 8 comprises the essentially cylindrical root portion 10 with the well-defined circular root plane 16 for which an exact rotation can be easier handled. Furthermore, the global root-to-tip alignment ensures an accurate alignment of the blade sections 8, 9 from the root 16 to tip 44, i.e. over the entire length of the blade 3. This provides a high robustness and correct aerodynamic profile, e.g., correct twist, of the assembled blade 3.

In FIGS. 2 to 9, a method for assembling a blade 3 made from two lengthwise blade sections 8, 9 has been described. However, in other embodiments the blade may also comprise more than two lengthwise blade sections.

Figure 10:
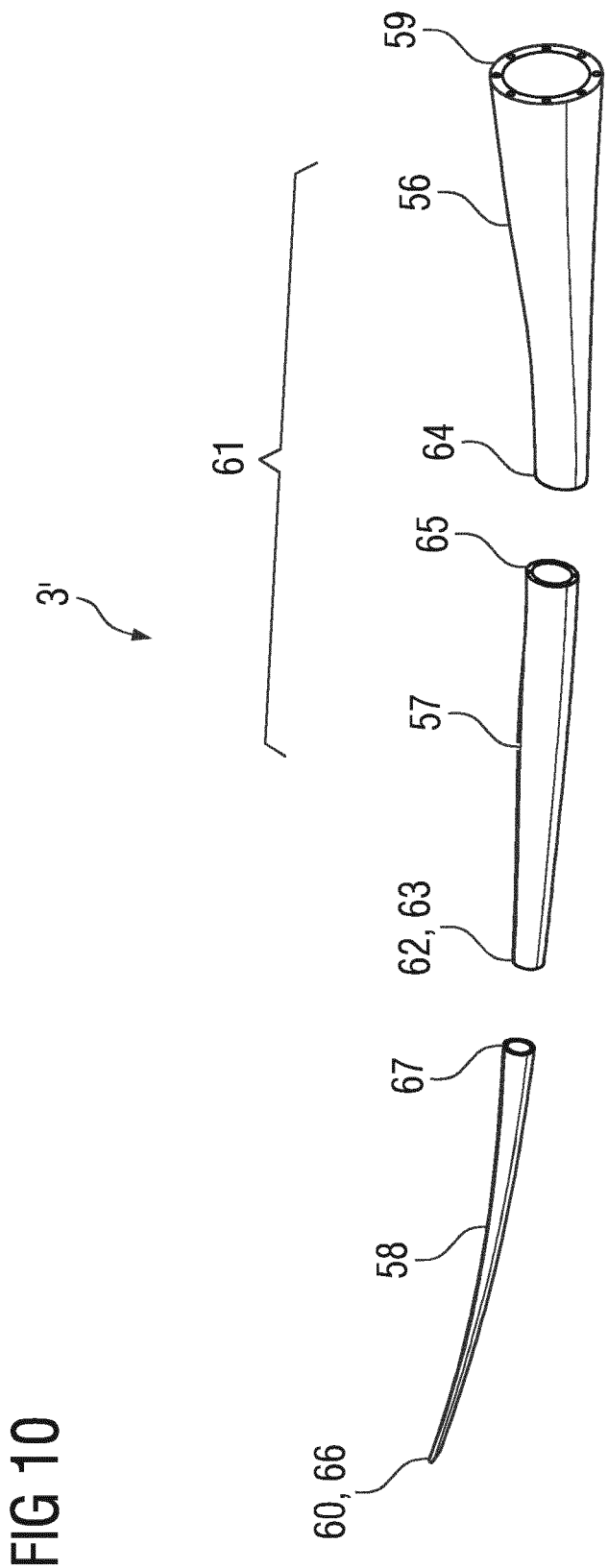
FIG. 10 shows a wind turbine blade according to another embodiment during an assembling process of the blade.

FIG. 10 shows as an example a wind turbine blade 3' during assembly, the wind turbine blade 3' comprising three lengthwise blade sections 56, 57, 58. In this example, the blade section 56 is an inboard blade section comprising a root portion 59 configured for attachment to the rotor hub 4. Further, the blade section 58 is an outboard blade section comprising a blade tip 60. The blade section 57 is an intermediate blade section between the sections 56, 58.

The three blade sections 56, 57, 58 are assembled by applying the above described method in a first manufacturing phase for joining sections 56 and 57 to a new section 61. Further, in a second manufacturing phase the new blade section 61 and the blade section 58 are joined with each other using the above described method.

Hence, during the first manufacturing phase the blade section 56 represents the inboard section and the blade section 57 represents an outboard section, in particular an intermediate outboard section. Further, during the second manufacturing phase, the new blade section 61 assembled from blade sections 56 and 57 represents the (new) inboard section and the blade section 58 represents the (new) outboard section.

In detail, in the first manufacturing phase, in step a), the intermediate outboard blade section 57 is positioned at a predefined end position 62. The intermediate outboard blade section 57 comprises an outboard end portion 63. In step b), the inboard blade section 56 is positioned adjacent to the intermediate outboard blade section 57. The inboard blade section 56 comprises an inboard end portion in form of a root plane 59.

In step c), a deviation of a current position of the root plane 59 of the inboard blade section 56 with respect to the outboard end portion 63 of the intermediate outboard blade section 57 from a nominal position of the root plane 59 with respect to the outboard end portion 63 is determined.

In step d), the intermediate outboard blade section 57 is kept at the predefined position 62 and the inboard blade section 56 is moved relative to the intermediate outboard blade section 57 to compensate for the determined deviation.

Then, the inboard blade section 56 and the intermediate outboard blade section 57 are joined with each other at an outboard end 64 of the inboard blade section 56 and at an inboard end 65 of the intermediate outboard blade section 57 by means of a known joining process. The result is the new inboard blade section 61.

In the second manufacturing phase, in step a), the outboard blade section 58 is positioned at a predefined end position 66. The outboard blade section 58 comprises an outboard end portion in form of a blade tip 60. In step b), the new inboard blade section 61 is positioned adjacent to the outboard blade section 58. The new inboard blade section 61 comprises an inboard end portion in form of the root plane 59.

In step c), a deviation of a current position of the root plane 59 of the new inboard blade section 61 with respect to the blade tip 60 of the outboard blade section 58 from a nominal position of the root plane 59 with respect to the blade tip 60 is determined.

In step d), the outboard blade section 58 is kept at the predefined position 66 and the new inboard blade section 61 is moved relative to the fixed outboard blade section 58 to compensate for the determined deviation.

Then, the new inboard blade section 61 and the outboard blade section 58 are joined with each other at an outboard end 63 of the new inboard blade section 61 and at an inboard end 67 of the outboard blade section 58 by means of a known joining process. The result is a fully assembled blade 3'.

The steps a) to d) performed for aligning and assembling the blade 3' (FIG. 10) during the first and second manufacturing phase are carried out in a similar manner as the steps a) to d) described in conjunction with the assembling of blade 3 (FIGS. 2 to 9). In particular, also inboard and outboard support structures similar as the inboard and outboard support structures 22, 23 (FIG. 2) are used.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a wind turbine blade, the method comprising:

a) positioning an outboard blade section at a predefined end position, the outboard blade section comprising an outboard end portion;
b) positioning an inboard blade section adjacent to the outboard blade section, the inboard blade section comprising an inboard end portion having a root portion with a blade root plane;
c) determining a deviation of a current position of the blade root plane of the inboard blade section with respect to the outboard end portion of the outboard blade section from a nominal position of the blade root plane with respect to the outboard end portion, wherein, in step c), a vector is determined pointing from the blade root plane towards a predicted position of the blade tip, the predicted position being predicted based on the current position of the blade root plane and assuming an assembled blade; and
d) moving the inboard blade section relative to the outboard blade section to compensate for the deviation, wherein, in step d), the inboard blade section is moved relative to the outboard blade section until the vector points towards the actual position of the blade tip of the outboard blade section.

2. The method according to claim 1, wherein the outboard end portion of the outboard blade section is the blade tip.

3. The method according to claim 1, wherein the outboard blade section is kept fixed at a predefined end position and the inboard blade section is moved relative to the fixed outboard blade section in six degrees of freedom.

4. The method according to claim 1, wherein the inboard blade section is moved relative to the outboard blade section by, firstly, moving the inboard blade section with respect to three rotational degrees of freedom, and by, secondly, moving the inboard blade section with respect to three translational degrees of freedom while keeping the rotational degrees of freedom fixed.

5. The method according to claim 1, wherein, in step c), the deviation is determined by using alignment markers on the inboard blade section and/or on the outboard blade section and means for marker recognition.

6. The method according to claim 1, wherein, in step c), the current position of the blade root plane is determined by means of at least three reference points on the blade root plane.

7. The method according to claim 1, comprising, after step d), the steps of re-assessing an alignment of the inboard blade section with respect to the outboard blade section in a connection region of the blade sections by means of alignment markers on the inboard blade section in the connection region, alignment markers on the outboard blade section in the connection region and means for marker recognition, and moving the inboard blade section in the connection region according to a result of the re-assessing.

8. The method according to claim 7, wherein the inboard blade section is moved in the connection region according to the result of the re-assessment only with respect to first and second translational directions and a rotation around a third direction while keeping the other translational and rotational degrees of freedom fixed, and wherein the first direction is parallel to a direction from a leading edge to a trailing edge of the blade, the second direction is a height direction, and the third direction is parallel to a longitudinal direction of the blade.

9. The method according to claim 7, wherein steps c) and d) are repeated after moving the inboard blade section in the connection region according to the result of the re-assessing.

10. The method according to claim 1, wherein, in step a), the outboard blade section is positioned by positioning an outboard support structure according to a predefined position, and positioning the outboard blade section on the outboard support structure by means of alignment markers on the outboard blade section.

11. The method according to claim 1, wherein, in step b), the inboard blade section is positioned by positioning an inboard support structure according to a predefined position with respect to the outboard support structure and/or the outboard blade section, and positioning the inboard blade section on the inboard support structure by means of alignment markers on the inboard blade section.

12. The method according to claim 11, wherein the inboard support structure comprises adjusting screws, jacks and/or rails, and wherein:
the inboard blade section is moved by means of the adjusting screws parallel to a first direction pointing from a leading edge to a trailing edge of the blade,
the inboard blade section is moved by means of the jacks parallel to a second direction being a height direction, and/or
the inboard blade section is moved by means of the rails parallel to a third direction being a longitudinal direction of the blade.

* * * * *